United States Patent
Hayashi et al.

(10) Patent No.: US 7,079,295 B2
(45) Date of Patent: Jul. 18, 2006

(54) VIBRATION DAMPING MECHANISM OF IMAGE PROCESSING DEVICE

(75) Inventors: Eiichi Hayashi, Saitama (JP); Tamio Takato, Saitama (JP)

(73) Assignee: Fujinon Corporation, Saitama (JP)

( * ) Notice: Subject to any disclaimer, the term of this patent is extended or adjusted under 35 U.S.C. 154(b) by 907 days.

(21) Appl. No.: 10/232,413

(22) Filed: Sep. 3, 2002

(65) Prior Publication Data

US 2003/0063331 A1    Apr. 3, 2003

(30) Foreign Application Priority Data

Sep. 28, 2001    (JP)    ............... 2001-304469

(51) Int. Cl.
*H04N 1/04* (2006.01)
*H04N 1/40* (2006.01)
*G03G 15/04* (2006.01)

(52) U.S. Cl. ............... 358/497; 358/494; 358/474; 399/210

(58) Field of Classification Search ........ 358/497, 358/494, 474; 399/210
See application file for complete search history.

(56) References Cited

U.S. PATENT DOCUMENTS

| 3,337,165 A | * | 8/1967 | Tatsuo | ............. 248/559 |
| 6,650,854 B1 | * | 11/2003 | Sone | ............. 399/211 |
| 2005/0046733 A1 | * | 3/2005 | Bang | ............. 348/335 |

FOREIGN PATENT DOCUMENTS

JP    10-257251    9/1998

* cited by examiner

*Primary Examiner*—Jerome Grant
*Assistant Examiner*—Houshang Safaipour
(74) *Attorney, Agent, or Firm*—Arnold International; Bruce Y. Arnold

(57) ABSTRACT

When the speed of carriages that are moved in an image processing device is increased in order to accelerate the processing speed, the acquired image data is degraded due to vibrations being transmitted to the carriages from a motor which drives the carriages. The present invention provides a vibration damping mechanism for such image processing devices wherein weights are provided at selected positions on the transmission paths of the vibrations from the motor to the carriages in order to damp the vibrations. Preferably, the weights are made of a permanent magnet material and the housing is made of a material, such as steel, that is attracted by a magnet. This enables the weights to be attached at any desired positions, such as on the housing base plate, on the lower housing, and at perimeter walls of the housing which support the carriages where vibrations, without the weights, would be excessive.

6 Claims, 6 Drawing Sheets

VIBRATION DAMPING MECHANISM OF IMAGE PROCESSING DEVICE

BACKGROUND OF THE INVENTION

Image processing devices that read images of a document operate by irradiating light from a light source such as a fluorescent lamp, etc., onto a document. The document may include, for example, text or image data that has been recorded on a paper surface, and the image processing device may perform different functions such as those of a copier or a scanner. In such devices, light that is reflected from the document is received by a light reception unit where it is imaged by an imaging lens onto a light receiver that is equipped with a photoelectric conversion device, such as a CCD. Generally, the imaging lens and photoelectric conversion device must be in predetermined positions for proper input of the data.

One or more mirrors are generally used to guide light that has been reflected from the document onto the light reception unit. In a still-document-type image reading device, because the light path length from the document to the light reception unit needs to be maintained constant when an illuminated portion of the document changes, a mirror is commonly arranged so that it can be moved along the document.

The structure of this type of image reading device is shown in FIGS. 8 and 9. FIG. 8 is a schematic perspective view showing the structure of a still-document-type image reading device 1. Two guide plates 2b, 2e that resemble shelves are provided on the sidewall of a longitudinal wall 2a of a housing 2 of the image reading device 1. A full-traverse carriage 3 is then loaded onto the guide plates 2b and a half-traverse carriage 4 is then loaded onto the guide plates 2e. These carriages are guided by the guide plates 2b, 2e, respectively, and are moved in the longitudinal direction of the housing 2, which serves as a frame for supporting the components of the image reading device and also to block extraneous light from reaching the light reception unit. A non-illustrated platen, preferably made of glass, is mounted on the top surface of the housing 2, and a document is then loaded on the platen. A light source 5, such as a fluorescent lamp, is loaded on the full-traverse carriage 3, and the document is illuminated by the light source. Furthermore, a light receiver 20 that is equipped with an imaging lens 6 and a photoelectric conversion device 7, such as a CCD etc., is provided at a suitable position on the base plate 2c of the housing.

Then, a first reflecting mirror (not illustrated) is provided on the full-traverse carriage 3 and second and third reflecting mirrors (not illustrated) are provided on the half-traverse carriage 4. A light source 5 illuminates a portion of the document, and light that has been reflected from the document is incident onto the first mirror, the second mirror, and the third mirror, in that order, and is then imaged by the imaging lens 6 onto a surface of a photoelectric conversion device 7. Thus, an optical path is formed from the document to the photoelectric conversion device 7 by the first, second and third mirrors. Since nearly the entire area of the document must be illuminated in order to acquire all the information contained on the document, the till-traverse carriage 3 should be movable over nearly the entire area of the platen glass. However, the length of the optical path from the portion of the document being read at any particular instant to the photoelectric conversion device 7 must also be kept constant. Therefore, the half-traverse carriage 4 is driven to move in synchronism with the full-traverse carriage 3, but at a rate of movement that is half that of the full-traverse carriage.

FIG. 9 is a schematic diagram which illustrates, in perspective view, a driving mechanism for moving the full-traverse carriage 3 and the half-traverse carriage 4. A shaft 8 that is aligned normal to the scanning direction of the carriages is supported so as to rotate near one end of the housing 2, and a pulley 8a is fitted into the central part of the shaft 8. A motor 9 is fixed to the base plate 2c of the housing, and a pulley 9a is fitted onto an output shaft of the motor. A first belt 11a is driven by the motor via the pulley 9a so as to drive a first intermediate pulley 10a and a second intermediate pulley 10b. The pulley 10b is integrally attached to the pulley 10a but has a smaller diameter. A second belt 11b is driven by the second intermediate pulley 10b. In this fashion, the motor 9 causes the shaft 8 to rotate, but at a rate that is slower than the rotation rate of the motor. Due to the reduced rotation rate of the shaft 8 as compared to that of the motor, vibrations of the carriages as they are moved along beneath the platen are reduced. Reduction of vibrations becomes especially important as the size (and hence mass) of the image processing device is reduced.

A drive pulley 13 is fitted onto one end of the shaft 8, and a wire rope 14 is wound several times around the drive pulley 13. A pair of intermediate pulleys 15, 16 are provided which are independently rotatable about a common shaft that is attached to the half-traverse carriage 4, with the axial direction of the shaft that supports these pulleys being aligned with the axial direction of the shaft 8. A pulley 17 is supported so as to be rotatable about a shaft near an opposite end of the housing 2 from the shaft 8, with the axial direction of the shaft which supports the pulley 17 being aligned with the axial direction of the shaft 8. Furthermore, a bracket 2d is provided at a position along a wall 2a of the housing 2, with the drive pulley 13, wire rope 14, pulleys 15, 16, 17, and bracket 2d all being positioned inside the housing 2.

In order to drive the carriages, one end of the wire rope 14 is fixed to the bracket 2d. The wire rope 14 then passes half-way around the pulley 16, and is attached to the full-traverse carriage 3 by a linking part 18. The wire rope 14 then passes several times around the drive pulley 13, passes half-way around the pulley 17 which is fixed in position relative to the housing 2, and then half-way around the pulley 15. The other end of the wire rope 14 then attaches to one end of a spring 19, which may be shaped as a coil. The other end of the spring 19 is attached to a sidewall of the housing 2. The linking part 18 includes a tongue 18a which projects from a base plate that forms the full-traverse carriage 3, and a screw 18b which may be threaded into the linking part 18. The wire rope 14 is clamped by the screw 18b and the tongue 18a so as to attach the wire rope 14 to the full-traverse carriage 3.

As taught in Japanese Laid Open Patent Publication H10-257251, the motor 9 may be attached to the bottom plate 2c of the housing 2 in order to achieve miniaturization of the image processing device. Therefore, vibrations of the motor 9 will inherently be transmitted via the housing 2 to the guide plates 2b and 2e, and this may cause the carriages, which are mounted on the guide plates 2b and 2e, to vibrate.

In recent years, an increase in the speed of image processing devices has come to be desired, and this has resulted in an increase in the moving speeds of the carriages. Even if the vibration of the motor 9 is made to be small, when the carriage speeds are further increased, there is a likelihood that vibrations which will result from the faster carriage movement will cause the obtained image data of the receiver unit to be degraded.

BRIEF SUMMARY OF THE INVENTION

The present invention relates to an image processing device such as an image reading device which irradiates light onto a document containing text or image data and acquires image information therefrom as it sequentially scans the document, or an image writing device which sequentially scans image data onto a photosensitive material such as printing paper in order to print an image of a document. The object of the present invention is to provide a vibration damping mechanism for an image processing device which reduces the transmission of vibrations of a motor to carriages of the image processing device.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
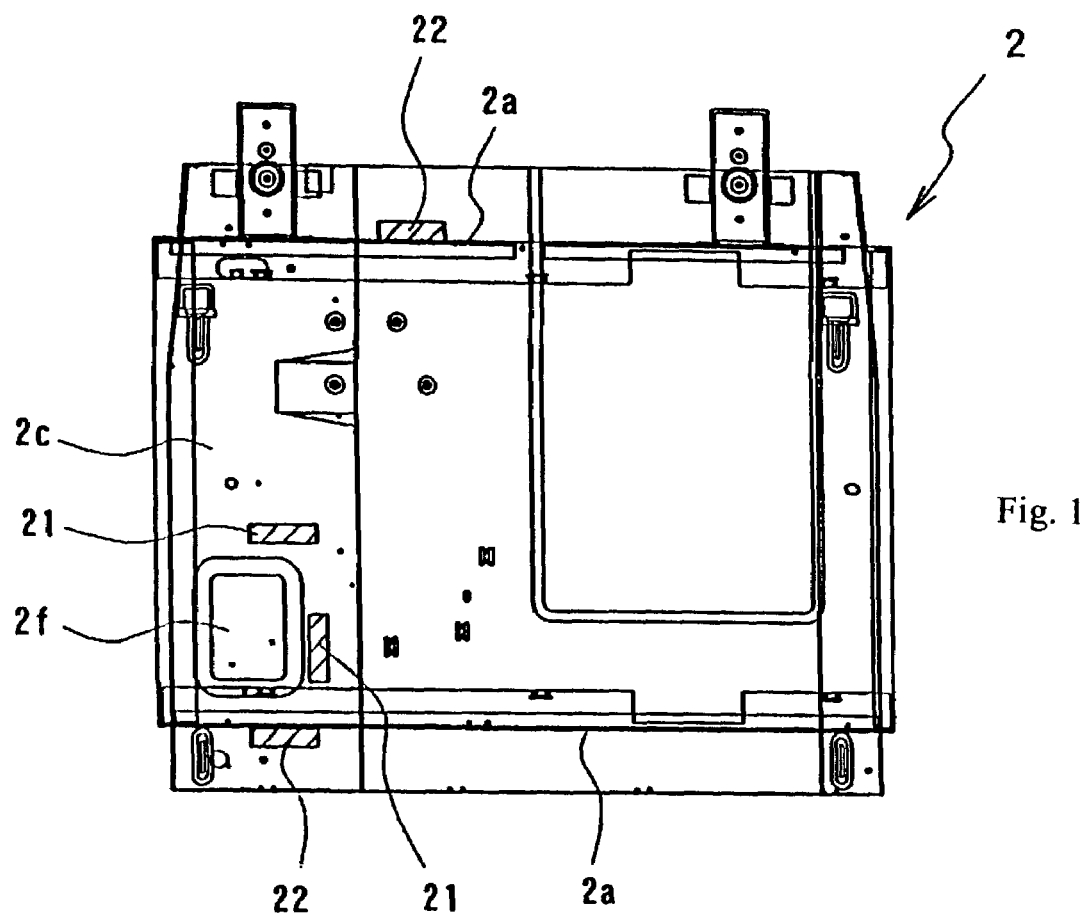
FIG. 1 is a plan view showing a housing of an image reading device equipped with the vibration damping mechanisms relating to the invention.

The vibration damping mechanism for an image processing device according to the present invention consists of weights that are added outside a periphery of a region of the housing that supports the motor. Preferably, the weights are added at positions where, without the added weights, vibrations of the housing due to operation of the motor are undesirably large. Adding weights at these positions inhibits the transmission of vibrations of the motor to an optical system of the image processing device. As vibrations of the motor are transmitted via a bottom region of the housing which supports the motor to other areas of the housing, by attaching weights outside a periphery of this region, vibrations of the housing will be damped. Because the housing supports the optical system of the image processing device, this results in fewer vibrations of the optical system when image-processing a document. Preferably, the total weight of the weights added to the housing exceeds the weight of the motor.

The construction with weights enables one to make the weights separate from the housing. This simplifies construction of the housing while ensuring that the periphery of a region of the housing that supports the motor has extra mass (due to added weights) for vibration damping. This construction also provides flexibility in positioning added weights at other positions where the vibration is excessive, as well as at perimeter walls that support carriages which are moved by the motor during image processing. The weights may be mounted to the housing with screws or bolts. For example, the weights may be fixed to the housing by forming through-holes in the housing and forming female threads in the weights. Screws may then be inserted through these through-holes to attach a given weight to the housing at a desired position. By forming slots along the perimeter of the housing instead of through-holes in order to receive the screws, the weights can be affixed at any desired positions along the perimeter of the housing.

As an alternative to, or as an addition to the weights being affixed with a fastener such as a screw or a bolt, the weights may be magnetized and the housing 2 made from a material such as steel so that the magnetized weights can be magnetically adhered to any position of the housing. Accordingly, the weights may be magnetically adhered to those positions of the housing where, without said weights, undesirably large vibrations of the housing due to the operation of the motor occur. Image processing devices tend to have individual differences even when mass produced to a common specification. Thus, the ideal positioning of weights to damp vibrations will vary from unit to unit, and magnetic weights provide the greatest flexibility in accounting for such individual differences among image processing units. Of course the housing must be made of material, such as steel, that is attracted by a magnet, and the weights preferably are made of a material that enables them to be magnetized as a permanent magnet. In addition, a material having a high specific gravity such as lead may be buried within the permanent magnet material so as to add additional weight to the permanent magnet material.

A specific embodiment of the present invention will now be set forth in detail.

Figure 2:
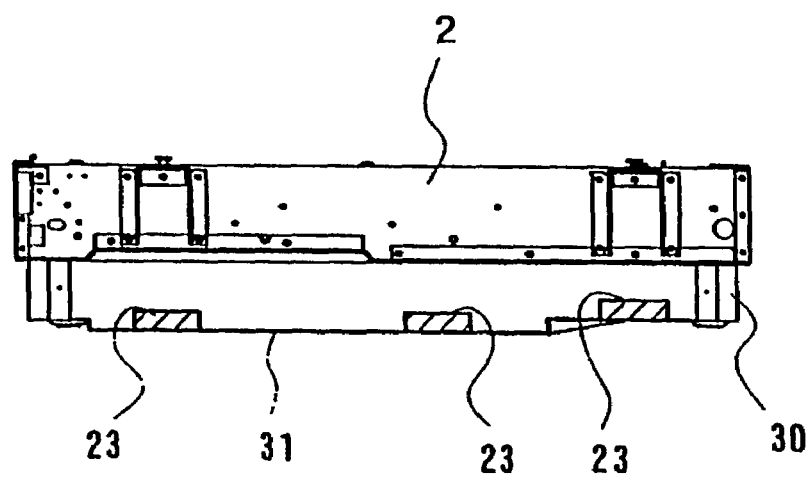
FIG. 2 is a back view of the housing shown in FIG. 1.
Figure 3:
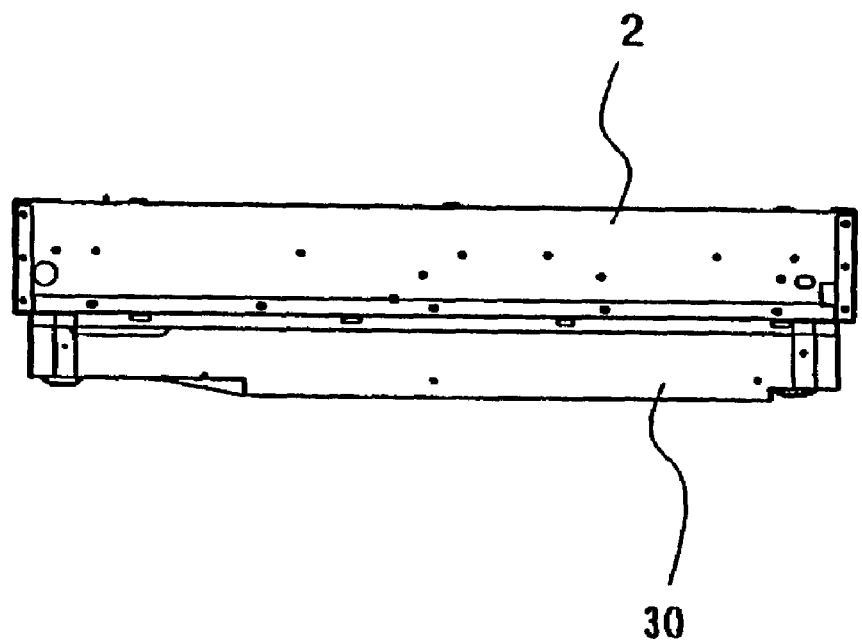
FIG. 3 is a front view of the housing shown in FIG. 1.
Figure 4:
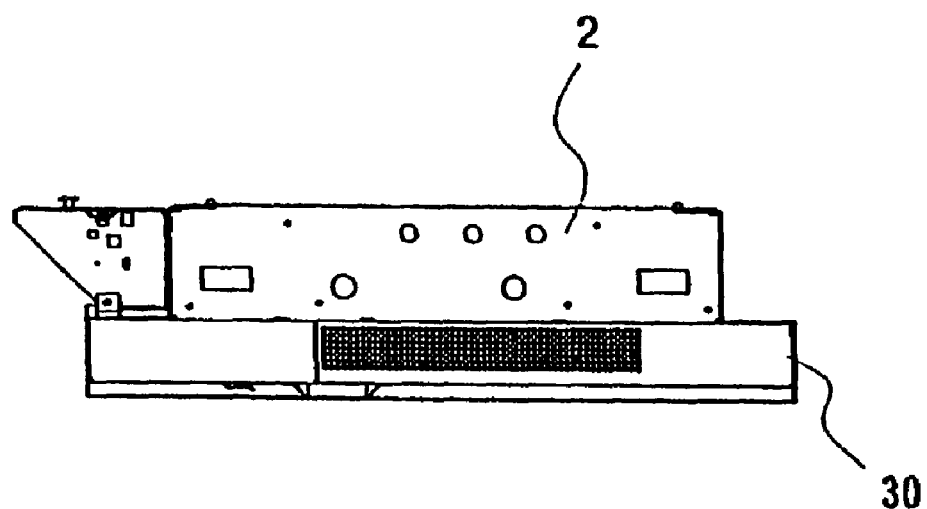
FIG. 4 is a left view of the housing shown in FIG. 1.
Figure 5:
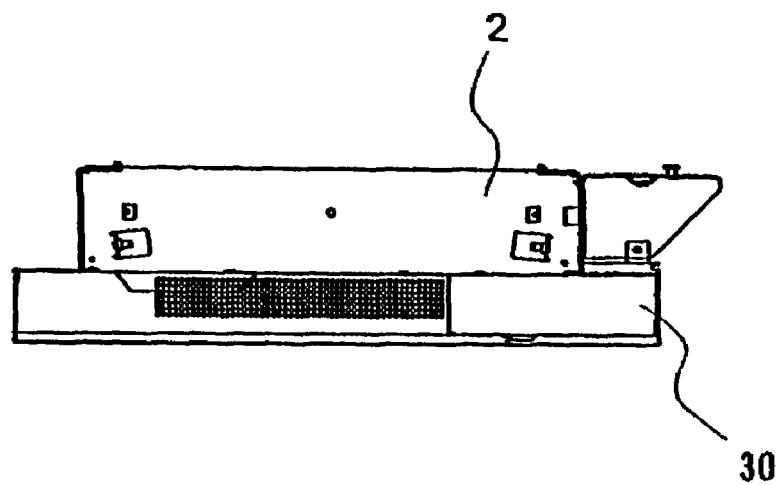
FIG. 5 is a right view of the housing shown in FIG. 1.
Figure 6:
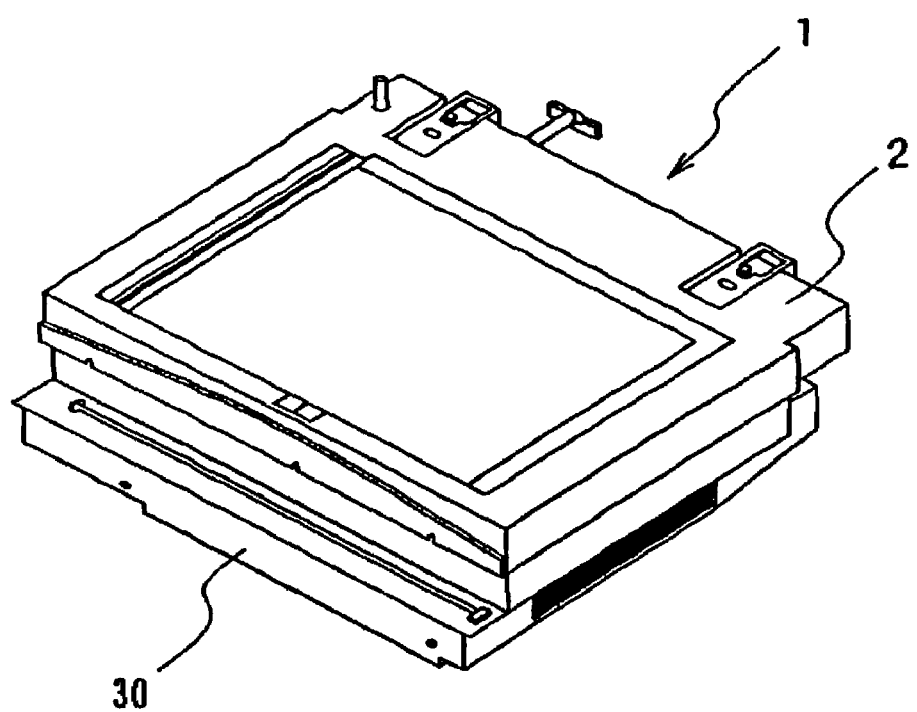
FIG. 6 is a perspective view of an image reading device that is suited to being equipped with the vibration damping mechanism of the present invention.

FIG. 1 is a plan view of a housing 2 of an image processing device. FIG. 2 is a back view, FIG. 3 is a front view, FIG. 4 is a left side view, FIG. 5 is a right side view, and FIG. 6 is a perspective view of the housing 2 of the image processing device. As shown in these figures, a housing 2 is formed into a nearly rectangular shape by folding an iron or steel sheet and welding it at appropriate sites. The top of the housing 2 is open so as to mount a platen (not illustrated) that preferably is made of glass for loading a document thereon. As shown in FIGS. 2–6, a lower housing 30 is mounted in the lower part of the housing 2. A control unit (not illustrated) for controlling the image reading device may be positioned in this lower housing 30. A recessed region 2f for supporting a motor is formed at one corner of a base plate 2c, and the motor is supported within the recessed portion 2f by a motor bracket (not illustrated).

Weights 21 (FIG. 1) are mounted just outside the periphery on those sides of the recessed portion 2f that face a center region of the housing so as to form a weighted periphery. These weights 21 are made to have a combined weight that exceeds the weight of the motor that is supported by the recessed portion 2f and the weight of the recessed portion 2f. These weights 21 preferably are formed of a permanent magnet having sufficient strength to magnetically adhere the weights to the housing at any desired position on the base plate 2c. In this manner, the weights can be mounted at positions which minimize vibrations that are generated by operation of the motor. Typically, the weights will be added where vibrations of the housing, without said weights, are undesirably large.

Also, weights 22 which have been magnetized may be magnetically adhered to any position on the outer side of wall 2a that forms a perimeter wall of the housing 2. A part of the vibration generated by the motor is transmitted to the guide plates 2b, 2e and to the carriages via the wall 2a. In this manner, the weights 22 are provided on the transmission paths to prevent the vibrations of the motor from being relayed to the carriages.

Furthermore, as shown in FIG. 2, weights 23 can also be mounted to a base plate 31 of the lower housing 30. Since these weights 23 are magnetized, they can be mounted at any position. Therefore, vibrations generated by the motor and transmitted through the base plate 31 of the lower housing 30 may be damped by positioning the weights 23 at positions of the base plate 31 where vibrations are excessive.

When the image reading device 1 scans a document, the motor operates and generates a vibration. This vibration is transmitted through the housing 2, but may be damped by the presence of the weights 21, 22, 23 on the transmission paths through the housing. Therefore, any vibrations which are transmitted to the guide plates 2b, 2e are greatly attenuated. This allows the carriages to be moved smoothly, and thus stabilizes image data that is acquired.

In the embodiment illustrated above, by having the weights 21, 22, 23 magnetized they can be readily adjusted to optimum positions for vibration damping. However, the weights need not be magnetized, as they can be attached by other means, such as using fasteners. For example, holes or slots may be formed in the housing 2 and the weights may be threaded to receive screws, or may have through-holes to receive bolts. In addition, the weights can be attached to the housing 2 using a double-sided adhesive tape, which also enables the weights to be readily mounted to the optimum positions for vibration damping.

Figure 7:
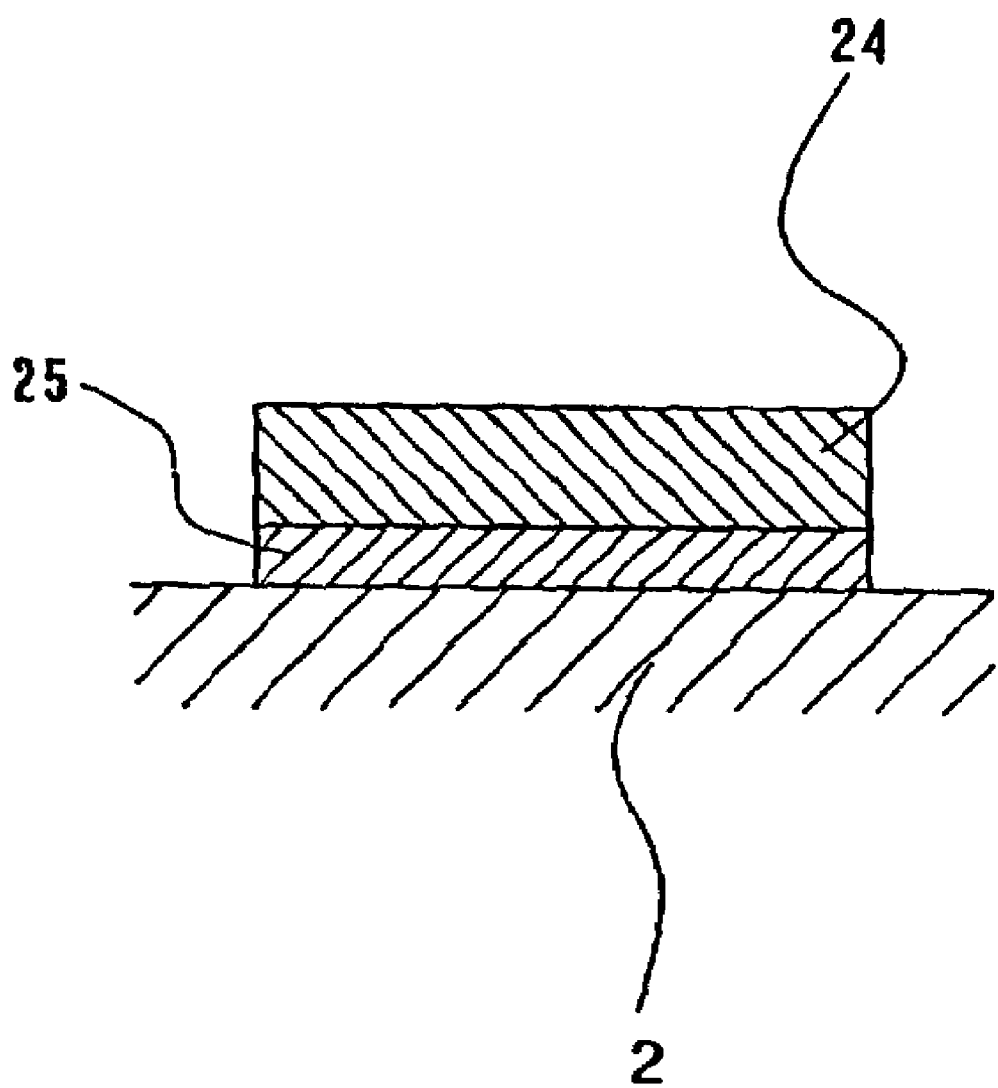
FIG. 7 is a side, sectional view of a vibration damping mechanism that relates to the invention.
Figure 8:
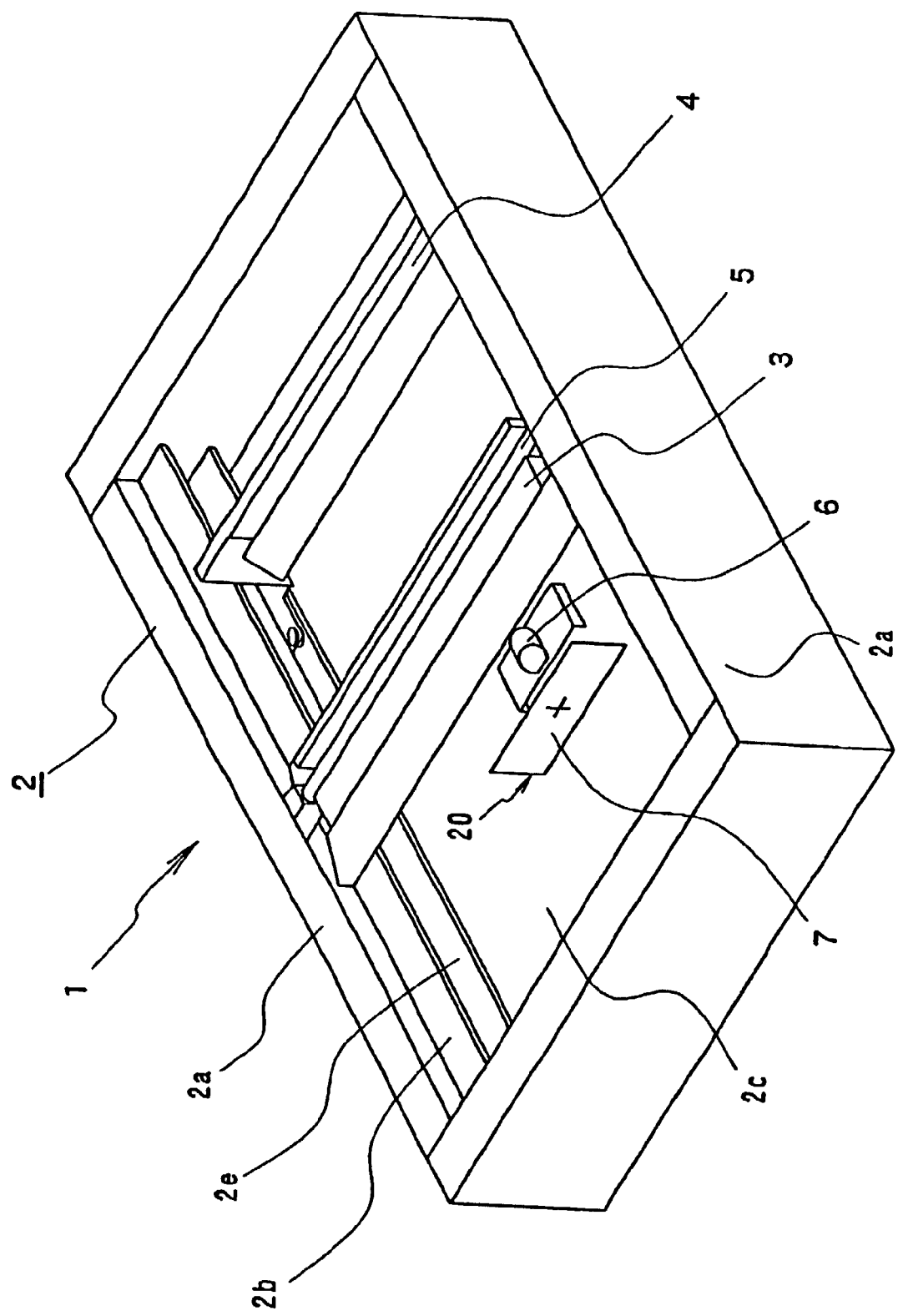
FIG. 8 is a schematic diagram which illustrates, in perspective view, some of the structure of a still-document-type image reading device according to a different invention, and it is this sort of structure that is suited to being equipped with the vibration damping mechanism according to the present invention.
Figure 9:
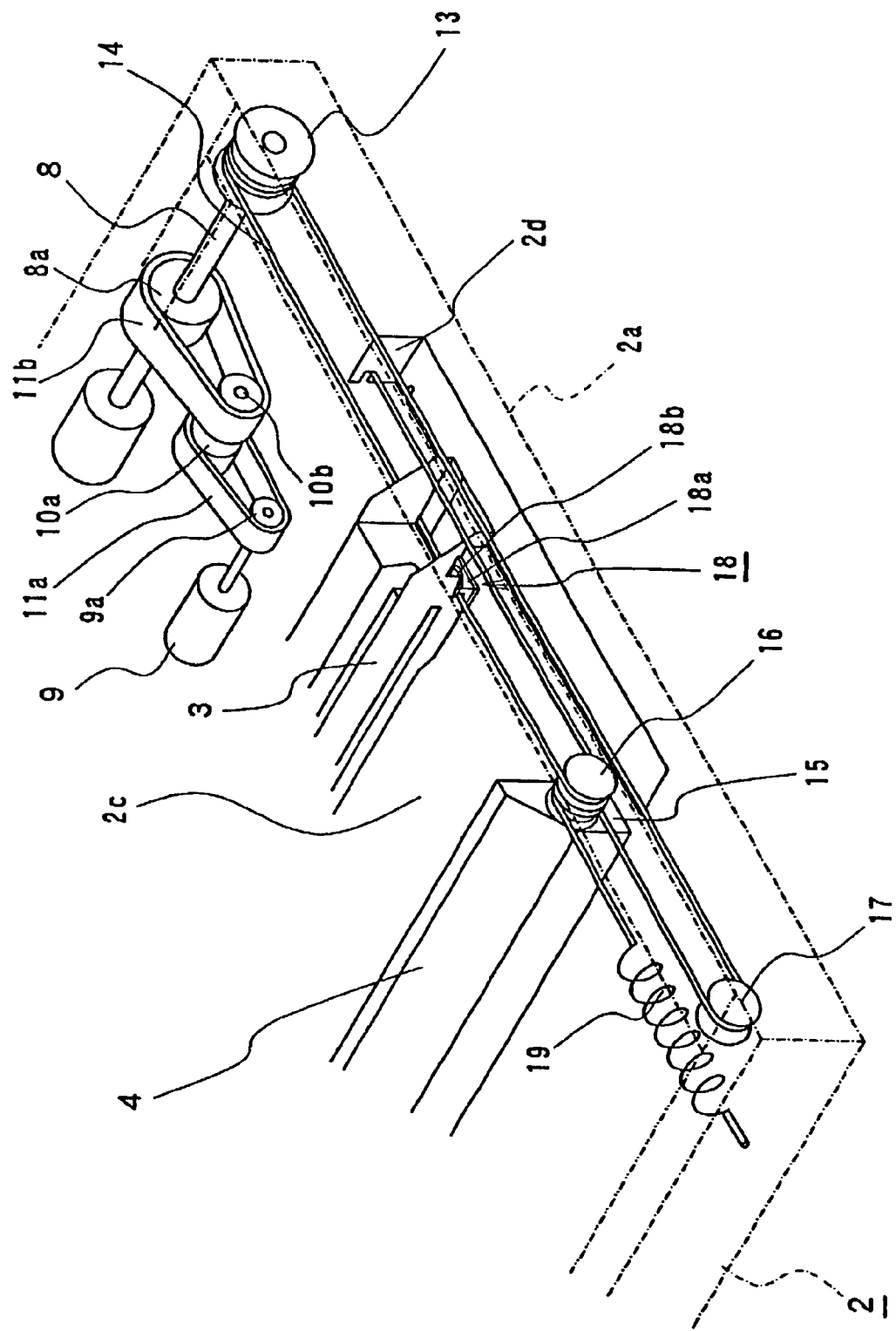
FIG. 9 is a schematic diagram which illustrates, in perspective view, a driving mechanism for moving carriages of the still-document-type image reading device illustrated in FIG. 8.

FIG. 7 is a view showing another embodiment of a vibration-damping weight. A vibration-absorbing member 25 such as a sponge or a vibration-absorbing rubber, etc. is bonded to a magnetized weight 24. Then, this vibration-absorbing member 25 is interposed between the housing 2 and the weight and magnetically adhered at a proper position of the housing 2. Accordingly, vibrations transmitted through the housing 2 are absorbed by the vibration-absorbing member 25 and damped by the weight 24. A rubber adhesive is preferably used to bond the vibration-absorbing member 25 to the weight 24.

As described above, according to the vibration damping mechanism of the present invention, the transmission of vibrations from a motor which drives carriages to the carriages is inhibited. Accordingly, movement of the carriages can be made to be smooth, thereby enabling high quality image data to be obtained. Moreover, by using weights as a vibration damping mechanism, with the weights being constructed separately from the housing, forming the housing is not complicated and the manufacturing cost of the housing is not increased. The weights can be adhered to any positions where damping of vibrations of the optical system is needed; thus, the carriages can be moved smoothly during the image processing.

The invention being thus described, it will be obvious that the same may be varied in many ways. In the embodiments described above, examples of mounting the vibration damping mechanism of the present invention to an image reading device were illustrated, but the invention is not limited to use with image reading devices. For example, the present invention can also be used in an image writing device, wherein image data is written by being scanned onto a photosensitive material by a carriage mechanism which successively irradiates a light beam carrying image data onto a fixed photosensitive material, to thereby form a copy of the image on the photosensitive material. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In an image processing device that includes an optical system, a carriage which supports an optical scanning member, a housing which supports the carriage, and a motor which is used to drive the carriage, the improvement of: providing a vibration damping mechanism which inhibits the transmission of vibrations from the motor to the optical system, said vibration damping mechanism comprising weights that are added outside a periphery of a region of the housing that supports the motor, with the combined weight of the weights that are added outside said periphery being larger than the combined weight of the motor and said region of the housing that supports the motor within said periphery.

2. The improvement as set forth in claim 1, wherein said region of the housing that supports the motor is recessed as compared with the housing surface immediately outside the periphery of a region of the housing that supports the motor.

3. The improvement as set forth in claim 1, wherein said weights are adhered to positions of the housing where, without said weights, vibrations of the housing due to operation of the motor are undesirably large.

4. The improvement as set forth in claim 3, wherein said weights are magnetized and the housing is made of a material so that the weights can be magnetically adhered to the housing.

5. The improvement as set forth in claim 1, wherein additional weights are added to walls that form a perimeter wall of the housing.

6. The improvement as set forth in claim 1, wherein additional weights are added to a bottom surface of the housing where vibrations, without said weights, are excessive due to operation of the motor.

* * * * *

UNITED STATES PATENT AND TRADEMARK OFFICE
CERTIFICATE OF CORRECTION

| | | |
|---|---|---|
| PATENT NO. | : 7,079,295 B2 | |
| APPLICATION NO. | : 10/232413 | |
| DATED | : July 18, 2006 | |
| INVENTOR(S) | : Hayashi et al. | |

It is certified that error appears in the above-identified patent and that said Letters Patent is hereby corrected as shown below:

<u>Col. 1, line 62</u>
Change "till-traverse" to -- full-traverse --.

Signed and Sealed this

Twenty-eighth Day of November, 2006

JON W. DUDAS
*Director of the United States Patent and Trademark Office*